(12) United States Patent
Baylot et al.

(10) Patent No.: US 8,794,675 B2
(45) Date of Patent: Aug. 5, 2014

(54) COAXIAL PIPE ELEMENT

(75) Inventors: Michel Baylot, Marseilles (FR);
Jean-Yves Goalabre, Marseilles (FR);
François-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 605 days.

(21) Appl. No.: 12/223,247

(22) PCT Filed: Feb. 6, 2007

(86) PCT No.: PCT/FR2007/050752
§ 371 (c)(1),
(2), (4) Date: Jul. 24, 2008

(87) PCT Pub. No.: WO2007/096547
PCT Pub. Date: Aug. 30, 2007

(65) Prior Publication Data
US 2010/0230953 A1    Sep. 16, 2010

(30) Foreign Application Priority Data

Feb. 24, 2006  (FR) ...................................... 06 01603

(51) Int. Cl.
*F16L 39/00* (2006.01)
(52) U.S. Cl.
USPC ..................... 285/123.15; 285/47; 285/123.3; 285/288.1
(58) Field of Classification Search
USPC ........... 285/47, 123.1, 123.3, 123.15, 123.17, 285/288.1
See application file for complete search history.

(56) References Cited

U.S. PATENT DOCUMENTS

| 3,654,691 | A | * | 4/1972 | Willhite et al. | ............... | 228/155 |
| 3,794,358 | A | * | 2/1974 | Allen et al. | ...................... | 285/47 |
| 4,014,369 | A | * | 3/1977 | Kobres, Jr. | .................... | 138/112 |
| 4,085,950 | A | * | 4/1978 | Alewitz | .......................... | 285/45 |
| 4,121,858 | A | * | 10/1978 | Schulz | ............................ | 285/13 |
| 4,400,019 | A | * | 8/1983 | Fruck | .............................. | 285/55 |
| 4,560,188 | A | * | 12/1985 | Berti et al. | ...................... | 285/47 |
| 4,779,652 | A | * | 10/1988 | Sweeney | ....................... | 138/113 |
| 4,876,780 | A | * | 10/1989 | Stahl et al. | .................... | 138/177 |
| 5,141,261 | A | * | 8/1992 | Ziu | ............................. | 285/123.1 |
| 5,402,831 | A | * | 4/1995 | Hollis | ........................... | 138/113 |
| 5,449,204 | A | * | 9/1995 | Greene et al. | ............ | 285/123.15 |
| 6,848,720 | B2 | * | 2/2005 | Carns et al. | ............... | 285/123.15 |

(Continued)

FOREIGN PATENT DOCUMENTS

| DE | 2647782 | 4/1978 |
| FR | 2751721 | 7/1996 |

(Continued)

OTHER PUBLICATIONS

English Translation of the PCT Written Opinion of the International Searching Authority, PCT/FR2007/050752.

*Primary Examiner* — James Hewitt
(74) *Attorney, Agent, or Firm* — Cozen O'Connor

(57) ABSTRACT

A coaxial pipe element (1) includes an outer pipe (1a) and an inner pipe (1b), and at each of its ends a junction forging (2a, 2b), each forging having at least an inner first branch ($3_2$) set back ($L_1$) from an outer first branch ($3_1$), in which all of the circular welds between the inner and the outer pipe and the junction forgings are made on the outside of the pipes.

31 Claims, 6 Drawing Sheets

(56) References Cited

U.S. PATENT DOCUMENTS

| | | | |
|---|---|---|---|
| 7,287,578 B2* | 10/2007 | Ricci et al. | 165/154 |
| 7,494,155 B2* | 2/2009 | Offredi | 285/47 |
| 7,681,922 B2* | 3/2010 | Galatello Adamo et al. | 285/41 |
| 7,938,148 B2* | 5/2011 | Carlier et al. | 141/65 |
| 2005/0212285 A1* | 9/2005 | Haun | 285/123.1 |

FOREIGN PATENT DOCUMENTS

| | | | |
|---|---|---|---|
| FR | 2873427 | 1/2006 | |
| FR | 2878936 | 6/2006 | |
| GB | 2315835 | 2/1998 | |
| GB | 2396196 A * | 6/2004 | F16L 9/18 |
| WO | WO 2006061512 A1 * | 6/2006 | F16L 59/02 |

* cited by examiner

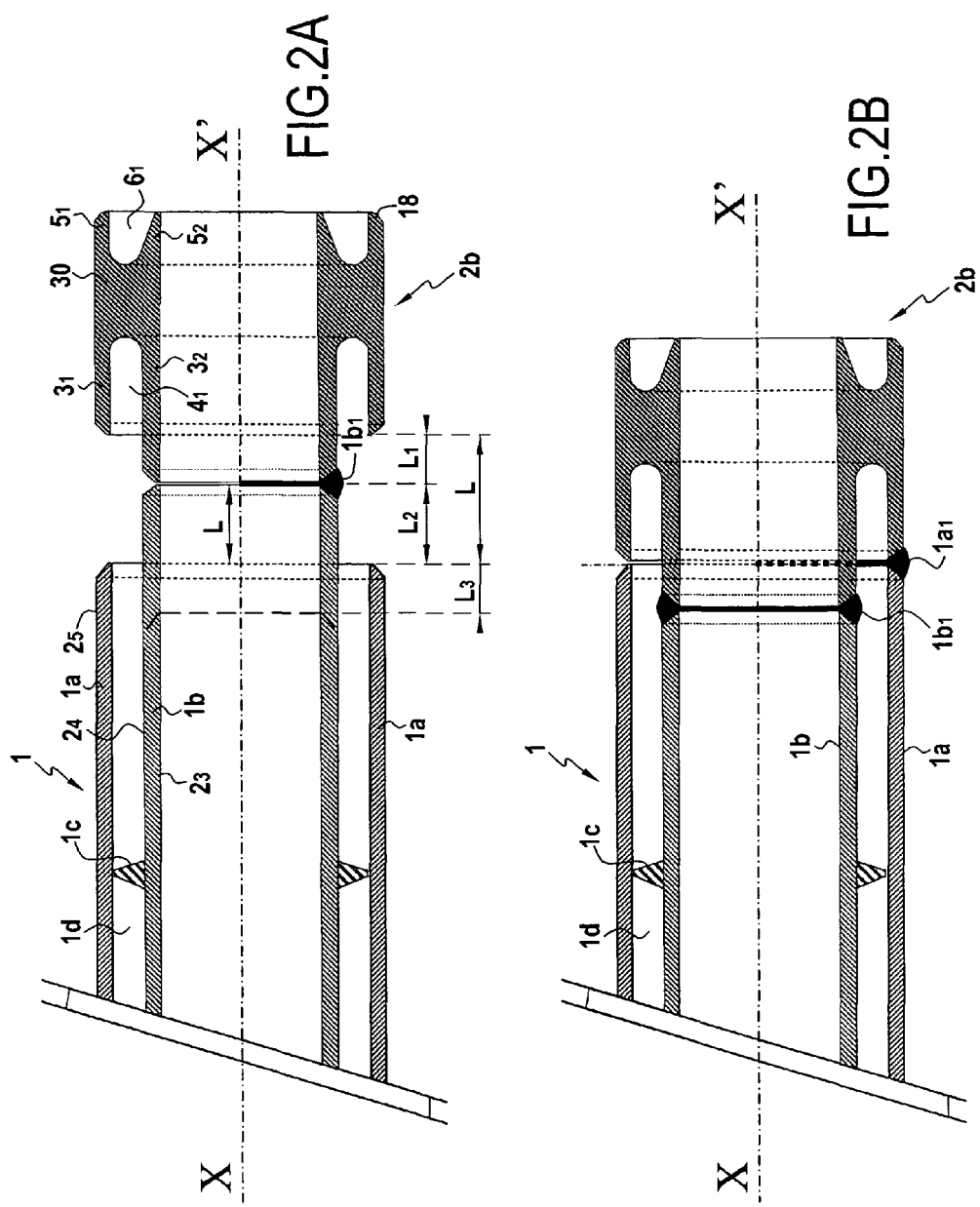

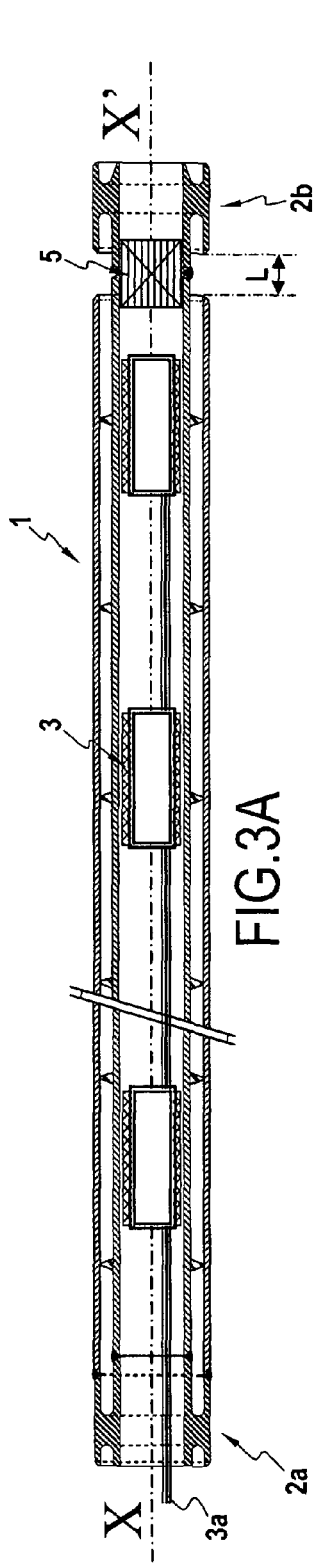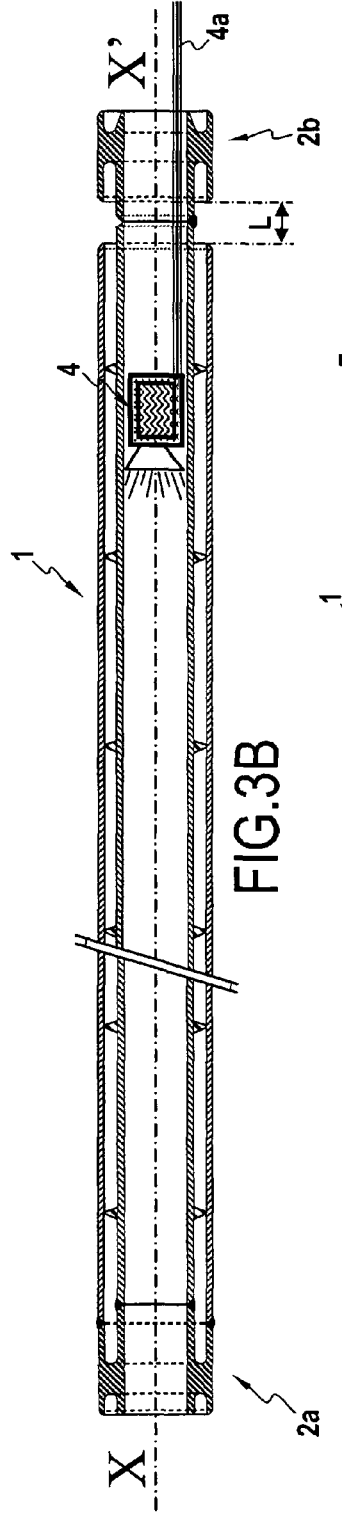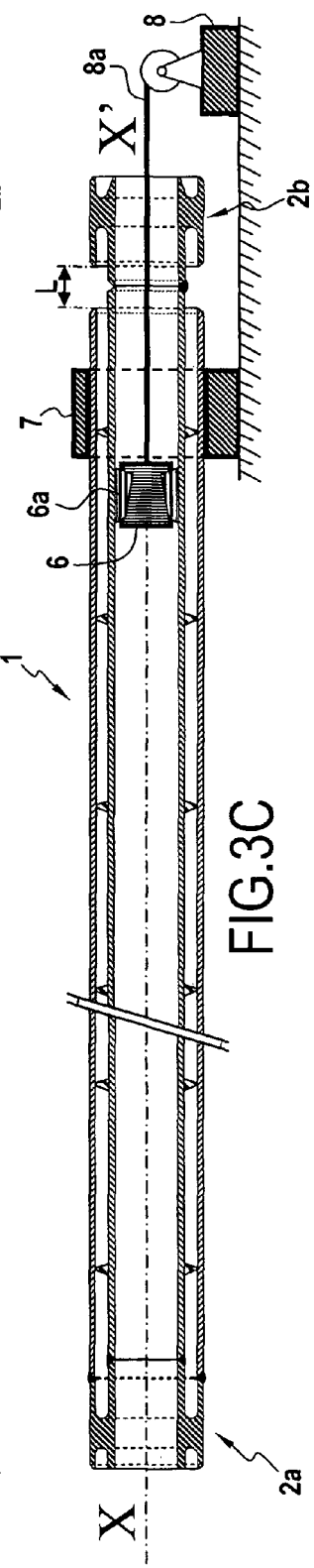

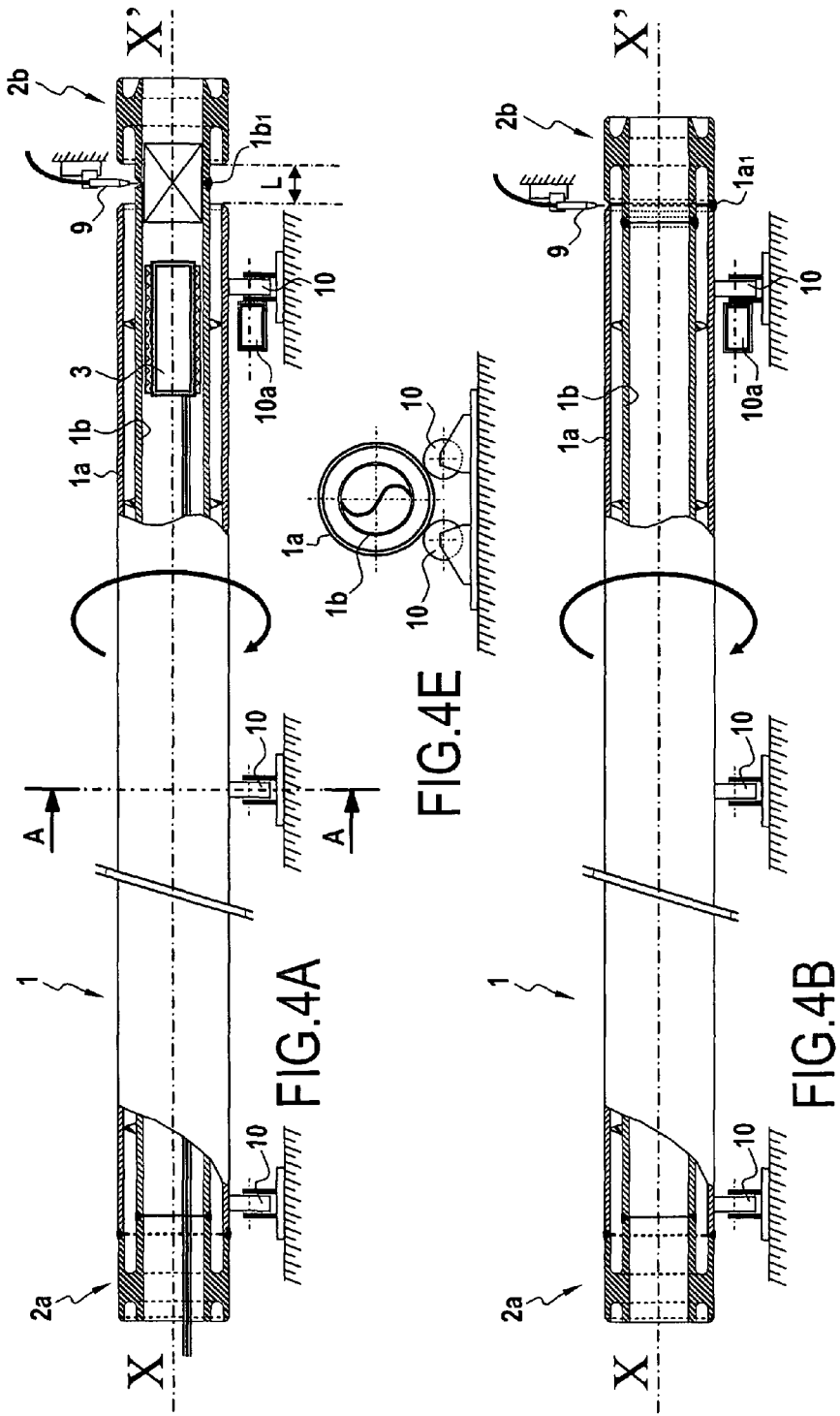

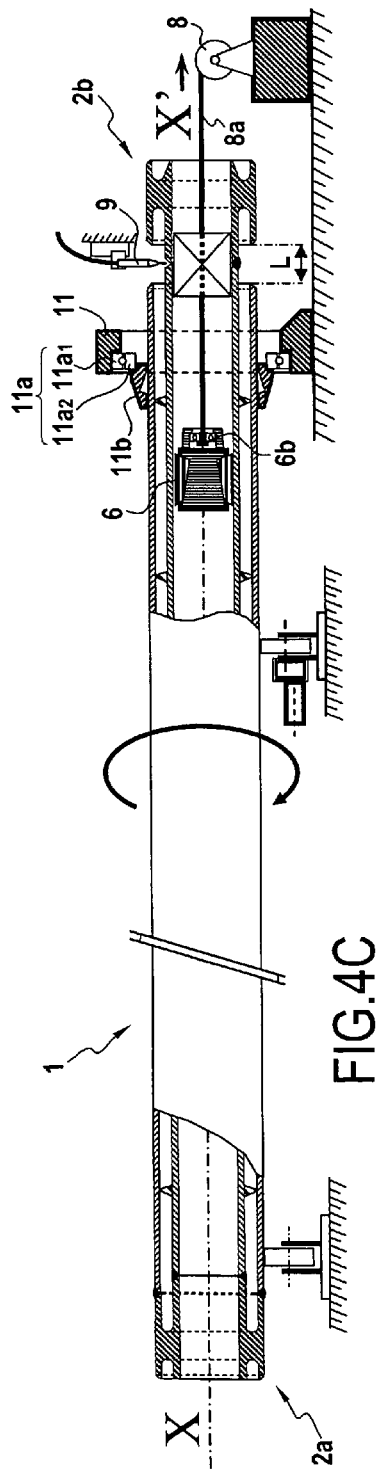
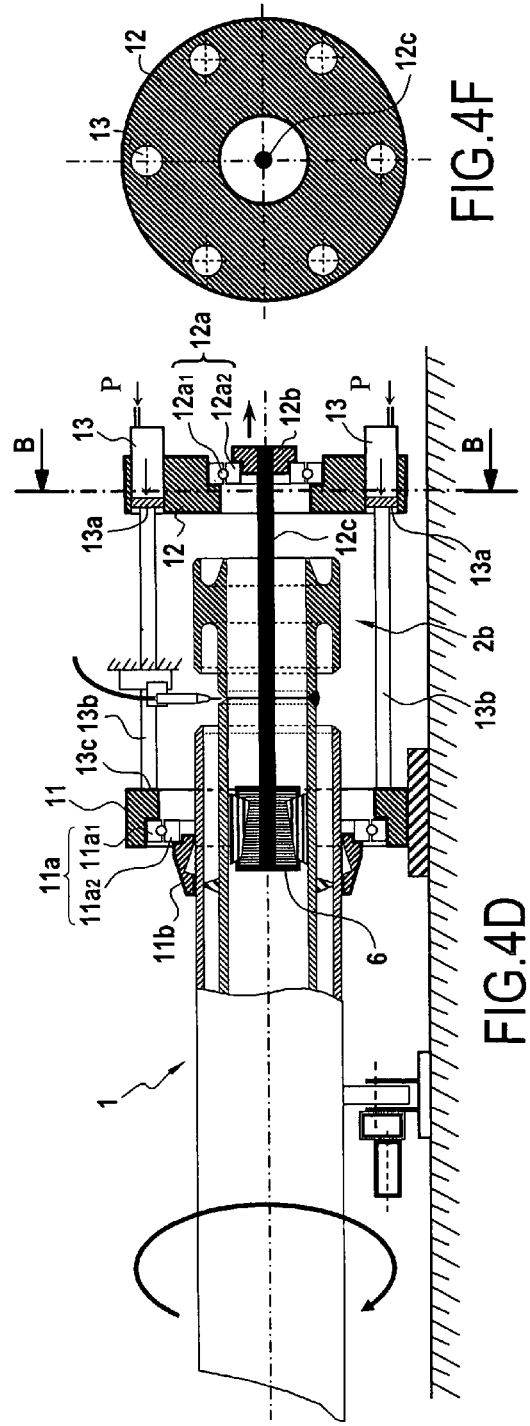

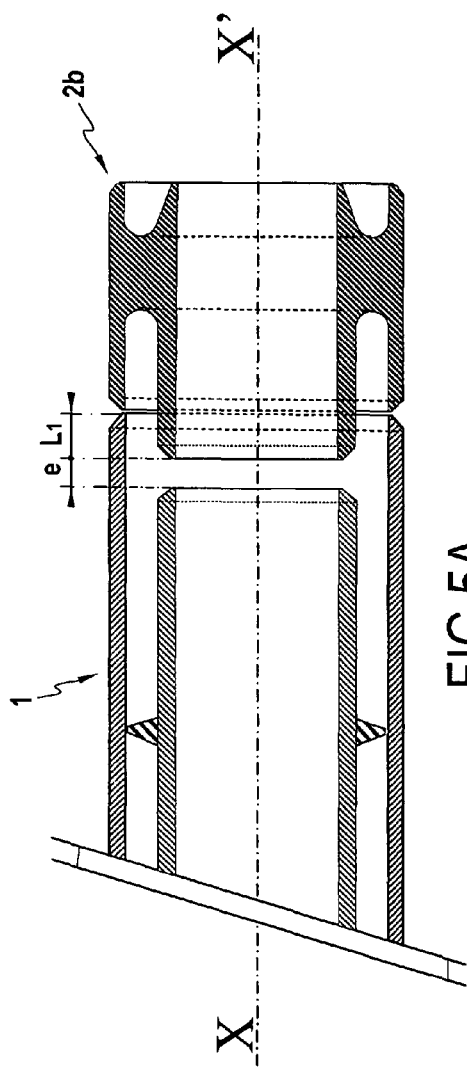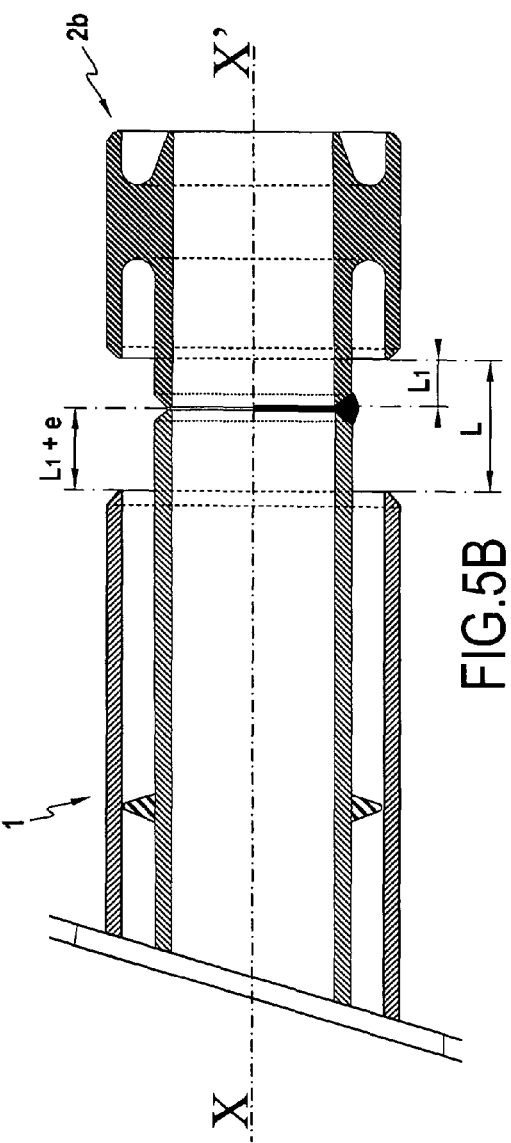

COAXIAL PIPE ELEMENT

PRIORITY CLAIM

This is a U.S. national stage of application No. PCT/FR2007/050752, filed on Feb. 6, 2007. Priority is claimed on the following application(s): Country: France, Application No.: 0601603, Filed: Feb. 24, 2006, the content of which is incorporated here by reference.

BACKGROUND OF THE INVENTION

The present invention relates to a method of fabricating a unitary coaxial pipe assembly element, in particular for undersea pipes conveying hot or cold fluid, preferably undersea pipes for use at great depths.

In most industrial fields, it is desirable to obtain insulating systems of high performance in order to maintain fluids conveyed in pipework at a constant temperature, so that transfers between pieces of equipment can be achieved over long distances, e.g. reaching several hundreds of meters or even several kilometers. Such distances are commonplace in industries such as oil refineries, liquefied natural gas installations (−165° C.), and undersea oil fields of the kind extending over several tens of kilometers. Such oil fields are being developed in ever-increasing depths, which can exceed 3000 meters (m).

The present invention relates in particular to coaxial pipe elements for use in fabricating undersea pipes that are installed over oil fields at very great depths, in particular bottom-to-surface connection pipes that are suspended between the bottom of the sea and a surface vessel anchored over said oil field.

Such coaxial pipes are referred to by the abbreviation PiP (for pipe-in-pipe), and they have both an inner pipe for conveying the fluid and an outer pipe placed coaxially around the inner pipe, also referred to as the "outer shell", that comes into contact with the surrounding medium, i.e. sea water. The annular space between the two pipes can be filled with an insulating material or it can be evacuated of any gas.

Such systems have been developed to achieve a high level of thermal performance, and specific versions have been developed that are better adapted for use at great depths, i.e. that are capable of withstanding the pressure at the sea bottom. Given that pressure under water is substantially equal to 0.1 megapascals (MPa), i.e. about 1 bar, for every 10 m of depth, the pressure that the pipe needs to be capable of withstanding is then about 10 MPa, i.e. about 100 bar at a depth of 1000 m, and about 30 MPa, i.e. about 300 bar at a depth of about 3000 m.

Such coaxial pipe assemblies are made by end-to-end assembly of unit lengths referred to below as "coaxial pipe elements" or as "coaxial pipe strings", of length that generally lies in the range 10 m to 100 m, and more particularly that is equal to about 12 m, 24 m, or 48 m, each.

In the context of installing undersea pipes at great depths, these unit length elements are fabricated on land. They are then transported to sea on a laying vessel. While being laid, the unitary coaxial pipe assembly elements are connected to one another on board the vessel progressively while they are being laid at sea. It is therefore important for the making of such connections to be suitable for incorporation in the method of mounting and assembling the pipe and laying it on the sea bottom with as little delay as possible, and for connections to be made quickly and easily.

For this purpose, use is made of junction pieces, i.e. steel connection forgings, that are assembled to the ends of said coaxial pipe assembly elements that are to be assembled together. The junction forging at the downstream end of a first as-yet unassembled coaxial pipe assembly element is connected to the junction forging at the free upstream end of a second coaxial pipe assembly element that has already been assembled at its downstream end.

These junction forgings also serve to reinforce the strength of pipes that are subjected to high levels of bending during laying, in particular in the connection zones between two said successive unit lengths, and more particularly for bottom-to-top connections or "rises", they serve to give them very great resistance to fatigue throughout the lifetime of such installations.

More particularly, the present invention relates to said junction forgings comprising two branches of revolution, comprising an outer branch and an inner branch that together form a fork defining said annular space, with the cylindrical free ends of the fork being assembled directly to the cylindrical ends of the outer and inner pipes, respectively.

Coaxial pipes and junction forgings of that type are described in particular in FR 2 873 427.

A fundamental operation for ensuring the mechanical reliability of PiP pipes, lies in the welds between the junction forgings and said coaxial pipes. In particular, welders must be capable of monitoring the welding that is being performed, and also after it has been performed, in particular with the help of weld inspection devices using ultrasound probes, which devices can be operated by an operator either manually or using a robot, and in any event the probe must be moved against and close to the weld, both axially in forward and backward translation over the weld zone and circumferentially around the entire periphery of the pipe in said weld zone.

That is why it is desirable to be able to perform welding between the junction forgings and the coaxial pipes from outside the pipes in question so as to make the welding easier to monitor. However, with junction forgings of the type comprising two branches of revolution having cylindrical ends that are assembled to the respective cylindrical ends of the inner and outer pipes, such welding from the outside is not possible for welding together the inner branch of the junction forging and the end of the inner pipe, at least for one of the two junction forgings, so welding must then be performed from inside said inner pipe, as explained below. Unfortunately, this welding operation from inside the inner pipe is difficult and complex to perform, and it is likewise difficult and complex subsequently to inspect the weld. It will be understood that when welding from the inside, an operator has great difficulty in positioning accurately either the welding torch or the inspection device.

As mentioned above, welding zones are particularly sensitive to the phenomenon of fatigue, both during laying and during the lifetime of the pipe, which is why it is important to be able to inspect reliability with great care.

In order to be able, from the outside of the inner pipe, to weld the inner branch of the junction forging to the end of the inner pipe, and in order to be able to do so at both ends of a unitary coaxial pipe element, one solution is to make junction forgings as a plurality of parts and/or to interpose fittings, in particular tubular half-sleeves that form two tubular half-shells that are interposed between the end of the outer branch of a junction forging and the corresponding end of the outer pipe, as shown in FIG. 1C. These half-shells are welded between the ends of the outer branch of the junction forging and of the outer pipe, and they are put into place after the inner pipe has been welded from the outside between the end of the inner branch of the junction forging and the end of the inner pipe.

However, those junction forgings that are complex and/or associated with additional elements of the shell type affect the mechanical reliability of the junction forging itself, and thus of the junction between the junction part and the pipe. One of the reasons is because it is necessary to perform welding in the longitudinal direction of the pipe in order to weld together the two tubular half-sleeves, even though this type of longitudinal welding is less reliable than is circular welding, and above all involves crossed welding between the circular welds interconnecting the tubular sleeves to the junction forgings or to the coaxial pipe ends and the longitudinal welds interconnecting the two additional tubular half-sleeves, said crossed welds constituting additional points of weakness.

Systems are also known in which the junction piece is made from two elements that are screwed and adhesively bonded together, but that type of junction piece also suffers from poor mechanical reliability.

FR 2 751 721 discloses a method of making the ends of a PiP associated with a method of reinforcing the connection zone between two unit lengths of PiP by means of a sliding sleeve presenting little clearance relative to the outer pipe, said sliding sleeve being secured to said outer pipe by adhesive. That disposition serves to increase the second moment of area of the cross-section locally so as to limit stresses in the coupling zone between two unit lengths of PiP, but it requires several mechanical parts to be fabricated that are complicated to mount and that require connection to be performed in a manner that is relatively difficult. In addition, the adhesive proposed remains subject to creep and it deteriorates during the thermal cycling to which pipes are subjected during a lifetime of 20 years to 30 years. Finally, that type of adhesive cannot be considered as being reliable for bottom-to-surface connections since the dynamic effects of swell and of currents on the pipes suspended between the floating support and the sea bottom rapidly degrade the adhesive plane, giving rise quickly to excessive fatigue in the PiP connection zone.

Thus, the problem posed is that of making a connection to a unit length of a PiP type coaxial pipe assembly that is improved in terms of making it easier to install the connection means and to perform the connection operations, in particular in terms of welding; and in which the connection zones, in particular the weld zones between junction forgings and unit pipe lengths can be provided in such a manner that the stresses generated during laying are minimized and the fatigue behavior in bottom-to-surface connections is greatly improved.

More particularly, a problem lying behind the invention is that of providing an improved method of fabricating a coaxial pipe element that includes, at each end, a junction forging constituted by a single forging having two branches of revolution, an outer branch and an inner branch, that are assembled directly to the ends of the outer and inner pipes, respectively.

SUMMARY OF THE INVENTION

To do this, the invention provides a method of fabricating a coaxial pipe element comprising an inner pipe and an outer pipe, and including at each of its ends a junction forging in the form of a body of revolution, each said junction forging having at least two first branches of revolution, including an inner first branch and an outer first branch, the cylindrical end of said outer first branch being set back by a length $L_1$ from the cylindrical end of said inner first branch.

In the method of the present invention, the following steps are performed in succession:

1) welding the cylindrical end of said inner first branch of a first junction forging to a first end of said inner pipe that is not covered by the outer pipe, welding being performed from the outside of said inner pipe; and 2) moving said outer pipe coaxially around said inner pipe so that a first end of said outer pipe makes end-to-end contact with the corresponding end of the outer first branch of said first junction forging, the second end of said inner pipe being set back from the corresponding second end of said outer pipe by a length $L_3$ that is not less than $L_1$; and 3) welding the end of said outer first branch of said first junction forging to the end of said outer pipe, from the outside of said outer pipe.

Then, according to the present invention, the method is characterized in that the following successive steps are performed:

4) reversibly expanding along the axial longitudinal direction said second end of said inner pipe so that it projects by a length $L_2$ from said corresponding second end of said outer pipe; and 5) from the outside of said inner pipe, while said inner pipe is in the expanded position, welding said second end of said inner pipe to the end of the inner first branch of a second said forging; and 6) resorbing at least part of the expansion of said inner second pipe until said second end of said outer first branch of said second forging comes end-to-end with said second end of said outer pipe; and 7) from the outside of said outer pipe, welding the end of said outer first branch of said second forging to said second end of said outer pipe.

It will be understood that in step 4), said inner pipe is expanded over a length $L_2+L_3$ such that the distance $L=L_1+L_2$ between the free end of said outer first branch of the second forging and the end of said inner pipe is sufficient to make it possible, from the outside of the inner pipe, to weld the free cylindrical end of the inner first branch of the second forging to the end of the inner pipe. In practice, this distance $L=L_1+L_2$ must be not less than 5 centimeters (cm) (which corresponds to the size of a welding torch), and it should preferably be at least 10 cm when equipment is used for moving the welding torch to travel around said pipe for welding, as explained below.

It will thus also be understood that when at rest, with the inner and outer pipes both being at the same temperature, without traction and without compression, the end of the outer pipe projects beyond the end of the inner pipe by a length $L_3$ that is not less than the difference in length $L_1$ between said inner and outer first branches of said forgings, such that once the expansion has been resorbed (step 6)), the end of said outer first branch comes into end-to-end contact with the end of said outer pipe.

In a first variant implementation of the method of the invention of fabricating a coaxial pipe element, in step 4), said inner pipe is expanded by being heated, preferably with the help of heater devices that are inserted and preferably moved inside said inner pipe, and that are caused to operate in optionally uniform manner along the inside of said pipe. It will be understood that the resorption of the expansion in step 4) then takes place merely by cooling.

In a second implementation, in step 4), said expansion is performed by applying mechanical traction XX' to said inner pipe with the help of a traction device comprising a winch or an actuator placed outside said inner pipe. It will be understood that the expansion is resorbed by releasing said traction.

It is also advantageous to be able to combine both expansion techniques, as explained further on below.

More particularly, in step 4), said expansion is performed by applying longitudinal traction to said inner pipe and simultaneous longitudinal compression to said outer pipe via their said second ends. This longitudinal compression is due to using means for blocking the outer pipe as explained below.

The present invention also provides a coaxial pipe element comprising an inner pipe and an outer pipe with an annular space, preferably filled with an insulating material, and at each end a sealed closure of said annular space, each closure being constituted by a junction forging in the form of a body of revolution, each constituted as a single block for joining two of said coaxial pipe elements together, end to end, each of said junction forgings comprising at least two first branches of revolution, in which an inner first branch of revolution is welded directly to one end of said inner pipe with a circular weld bead and an outer first branch is welded directly to the end of said outer pipe with a circular weld bead, said inner first branches of revolution being longer than said outer first branches by a length in $L_1$ in the axial longitudinal direction of said coaxial pipe element, each of said junction forgings at each end of said pipe element being designed to be assembled at one end to the end of said outer and inner pipes of said coaxial pipe element, and at an opposite end directly to another said junction forging, itself assembled by welding to the end of another unit coaxial pipe element, the element being characterized in that all of said circular weld beads are located on the outside of the inner and outer pipes.

The term "junction forging constituted by a single block" is used herein to mean a junction forging made as a single piece and not by assembling a plurality of parts.

Furthermore, the term "directly welded" is used herein to mean that the ends of said inner and outer pipes and of the forging are assembled together without interposing any intermediate part or element.

Finally, the term "weld bead located on the outside" is used to mean that said weld bead is made on the outer surface of the inner or the outer pipe respectively, as appropriate.

In a preferred implementation of the method of the invention:

in step 2), said second end of the outer pipe at its end for connection to said second forging is adjusted so as to project beyond said corresponding second end of the inner pipe by a length $L_3=L_1+e$; and in step 4), said inner pipe is expanded by a length $L_2$ greater than or equal to $L_1+e$, such that in step 6), part of said expansion is resorbed, and at the end of the welding in step 7), said inner pipe is subjected to traction corresponding to residual elongation less than or equal to e.

In practice, e represents 5 millimeters (mm) to 100 mm for an inner pipe element having a length of 25 m to 50 m.

It will be understood that this residual elongation is due to the fact that the end of said inner first branch of the second forging projects by a length $L_1$ relative to the end of said outer first branch of said second forging at the end of step 6), and the end of said inner pipe can withdraw only through a length $L_1$. At the end of step 7), the residual elongation of said inner pipe is less than or equal to e, under the following circumstances:

the residual elongation of the inner pipe is substantially equal to e when the expansion of the inner pipe is obtained by direct traction on the inner pipe, giving rise to a corresponding compression stress in the outer pipe;

the residual elongation of the inner pipe represents a percentage $R_{th}$ of e when the expansion is obtained by a thermal effect, given that during cooling of the inner pipe after welding, the traction exerted by said inner pipe on the forging gives rise to corresponding longitudinal compression of said outer pipe via its second end, thereby having the effect of shortening the string, and correspondingly reducing the traction strength in the inner pipe. Said percentage $R_{th}$ is a function of the ratio between the areas of the cross-sections of steel constituting the inner pipe and the outer pipe; and the residual elongation of the inner pipe represents a percentage $R_{mix}$ of e when the expansion is obtained by combining mechanical traction and the thermal effect, $R_{mix}$ lying in the range 100% and $R_{th}$.

This embodiment with an inner pipe under traction stress is particularly advantageous when the coaxial pipe is in service, being used at the sea bottom and the temperature of the fluid it conveys reaches high temperatures (120° C. to 150° C.), the temperature rise causing the inner pipe to expand relative to the outer pipe which remains in contact with the temperature at the sea bottom (3° C. to 5° C.), thereby causing said inner pipe to be compressed, given that it is blocked at its ends by said junction forgings. This compression is conventionally handled by installing centralizer elements between said inner and outer pipes, but they are expensive, difficult to install, and give rise to thermal bridges that correspondingly reduce the effectiveness of the insulation system. Thus, leaving residual traction in the inner pipe during the fabrication method of the invention enables the compression stress of the inner pipe to be reduced correspondingly once it is in service, and thus advantageously makes it possible to increase the spacing between centralizer elements, thereby reducing the number of centralizer elements.

The present invention also provides a coaxial pipe element as defined above, characterized in that said inner pipe is subjected to traction stress exerted by each of said junction forgings at each end when said coaxial pipe element is not in service.

The term "not in service" is used to mean that said coaxial pipe element is not assembled in a coaxial pipe element assembly and/or is not being handled, or that it is assembled in a coaxial pipe element assembly but that said assembly is not being handled, and/or that it is not conveying a fluid. Such a situation occurs at the end of the fabrication process on land, during transport, and during installation when the pipe element or the pipe is at ambient temperature, until the pipe is resting on the sea bottom at the temperature of said sea bottom while waiting for production to start, and finally, in the event of a prolonged stoppage in production, with said inner and outer pipes then stabilizing at the temperature of the sea water (3° C. to 5° C.). The term "pipe element or pipe at ambient temperature" is used to mean that said inner and outer pipes are at the same temperature as the temperature of the surrounding air or sea water, as appropriate, assuming the pipe is under water.

It will be understood that said traction stress is due to said residual elongation of the inner pipe relative to its length at rest after partially resorbing said expansion in step 6) and after the welding in step 7). It will be understood that the term "rest" is used herein to mean that said inner pipe is not subjected to any traction or compression, as happens when it is not in service and in the absence of any junction forging.

It will thus be understood that the traction stress exerted by said junction forgings is exerted in opposite directions at each of the ends of the unit pipe element.

In the present invention, the presence of a closure junction forging at each end of the unit pipe element also makes it possible to assemble the junction forgings on land with a high vacuum being established or with an insulating material being confined in the annular space between the inner and outer pipes, which would be difficult to perform at sea.

Advantageously, while said coaxial pipe element is not in service, said inner pipe is subjected to traction corresponding to traction stress that is less than 90%, preferably in the range of from about 5% to about 75%, of the elastic limit of the steel constituting said inner pipe, i.e. in particular at ambient temperature.

More particularly, and in practice, this traction stress corresponds to the traction to be exerted on a said inner pipe having a length of 25 m to 50 m in order to lengthen it by 5 mm to 100 mm.

This traction stress on the inner pipe can be detected and measured by known means and methods, either of the non-destructive type or of the semi-destructive type.

Means and methods for detecting traction stress comprise, for example:
- installing strain gauges on the outer pipe parallel to the axis XX of the PiP and circularly, perpendicular to said axis; and
- then piercing a hole of small diameter close to said strain gauges, e.g. having a diameter of 4 mm, and extending through 75% to 80% of the thickness of the pipe so as to avoid puncturing the pipe.

In the absence of any prestress, no modification will be observed in the strain gauges. In the presence of the inner pipe being prestressed, then in the vicinity of the hole compression stresses that exist in the outer pipe will be relaxed, giving rise to localized elongation parallel to the axis of the PiP, which elongation is revealed by said longitudinal and circular strain gauges. Knowing the elongation values obtained in the vicinity of the hole, finite element calculation using a fine mesh, and known to the person skilled in the art, makes it possible to determine appropriately the compression stresses in said outer pipe, and thus to deduce therefrom the approximate traction stress within the inner pipe.

Non-destructive means also exist that are based either on bombardment with rapid neutrons that follow a path that is modified depending on whether said pipe is subjected to traction stress or to compression stress. That method is very difficult to implement, but it is commonly used for revealing a state of stress relaxation in certain sensitive mechanical parts that are used mainly in aviation or in the space industry.

As a result of said traction in the inner pipe, when the ends of the coaxial pipe element are separated from at least one of the said junction forgings welded to said end, said inner pipe is observed to shorten.

In practice, the inner pipe is observed to shorten by 5 mm to 100 mm for an inner pipe element having a length of 25 m to 50 m.

Furthermore, as mentioned above, compression is generally also observed in the outer pipe, but by a smaller amount.

More particularly, said coaxial pipe element is designed for assembling steel undersea pipes and presents a length lying in the range 10 m to 100 m, and preferably in the range 20 m to 50 m.

According to other advantageous characteristics:
- said outer and inner first branches of said forgings of revolution are of substantially the same thickness respectively as said inner and outer pipes at their ends; and
- the insulating material is a microporous or nanaporous material, preferably an aerogel, and more preferably in the form of grains having a diameter of from about 0.5 mm to about 5 mm.

Advantageously, said welding is performed with a device comprising a stationary welder head, preferably vertically above said pipe element, and said pipe element is caused to rotate about its longitudinal axis XX', preferably with the help of motor-driven wheels or turning gear on which said outer pipe rests.

Also advantageously, the expansion is performed with a traction device that comprises or co-operates with:
- means for blocking said inner pipe, thus enabling said inner pipe to be caused to move in longitudinal translation in expansion when the traction device is actuated, while allowing said inner pipe to rotate about its longitudinal axis XX' where appropriate; and
- means for blocking said outer pipe, preventing any movement in longitudinal translation of said outer pipe, and allowing it to rotate about its longitudinal axis XX'.

More particularly, said blocking means for blocking the outer pipe comprise:
- a first device for blocking by radial compression that is disposed in stationary manner around said outer pipe, such as a blocking wedge collar; and
- a first peripheral body that is stationary relative to the ground, co-operating with said first blocking device via a first bearing allowing said outer pipe to rotate about its longitudinal axis XX'.

Still more particularly, said first bearing comprises crossed roller bearings in and between an inner cage secured to said collar and an outer cage secured to said stationary first peripheral body.

In a preferred embodiment, said traction device comprises or co-operates with at least one tie member constituted by a rigid rod or a cable, suitable for being moved in longitudinal translation XX' by a winch or an actuator connected to a second blocking device for blocking said inner pipe by applying radial compression to the inner wall of said inner pipe, disposed inside said inner pipe, such as a self-locking mandrel.

More particularly, said traction device comprises at least two diametrically-opposite actuators, preferably at least four actuators that are regularly distributed circularly, having pistons secured to rods that come into abutment against said stationary first peripheral body supporting said first bearing, said actuators being connected to said tie member via a second bearing, preferably constituted by a crossed roller bearing, comprising a second peripheral body that is stationary relative to the ground supporting said actuators, suitable for co-operating with a support secured to said tie member, such that by applying pressure P to said actuators, the tie member exerts traction on the inner pipe while allowing said pipe element to rotate about its longitudinal axis XX', said first and second peripheral bodies and the rods of the actuators remaining stationary relative to the ground, thus enabling a stationary welder head to be used.

BRIEF DESCRIPTION OF THE DRAWINGS

Other characteristics and advantages of the present invention appear in the light of the following detailed description with reference to the following figures, in which:

FIG. 2A is a side view in longitudinal section showing the right-hand end of a PiP type string of the invention, showing the transient and longitudinal expansion along the axis XX' of the inner pipe over a length $L_3+L_2$, said inner pipe being initially set back by a length $L_3$ relative to the outer pipe, so as to make it possible to weld said inner pipe to the end forging from the outside;

FIG. 2B is a section identical to the section of FIG. 2A, after the expansion of said inner pipe has been resorbed, the end forging then coming into contact with the outer pipe and thus making it possible to make the outer weld from the outside;

FIG. 3A is a side view in longitudinal section of a PiP type string of the invention, in which the expansion of the inner pipe is performed by heating said inner pipe by using three electrical heater cartridges that are distributed along said inner pipe;

FIG. 3B shows another method of heating using a gas or fuel burner, or indeed a hot air generator;

FIG. 3C shows another way of expanding the inner pipe based on applying traction to the end of said inner pipe by means of a winch and a cable that is connected to a blocking device installed close to the end of said inner pipe;

FIG. 4A shows how the end forging is welded to the inner pipe of the PiP of FIG. 3A, the entire PiP being subjected to rotation in order to perform said welding with the help of a stationary welder head;

FIG. 4B shows how the end forging is welded to the outer pipe of the PiP after the inner pipe has retracted merely by cooling, the PiP as a whole being set into rotation to enable said welding to be performed with the help of a stationary welder head;

FIG. 4C shows the end forging being welded to the inner pipe of the FIG. 3C PiP, the entire PiP being set into rotation to perform said welding with the help of a stationary welder header;

FIG. 4D shows the welding of the end forging on the inner pipe of the PiP with a traction device comprising hydraulic actuators, the PiP as a whole being set into rotation in order to perform said welding with the help of a stationary welder head;

FIG. 4E is a section view on AA of FIG. 4A;

FIG. 4F is a section view on BB of FIG. 4D; and

FIGS. 5A and 5B are side views in longitudinal section showing the right-hand end of a PiP type string of the invention, respectively at rest before assembly, and when expanded in order to weld the inner pipe to the end forging, said inner pipe being subjected to traction after being welded to said end junction forging.

DETAILED DESCRIPTION OF THE PRESENTLY PREFERRED EMBODIMENTS

Figure 1A:
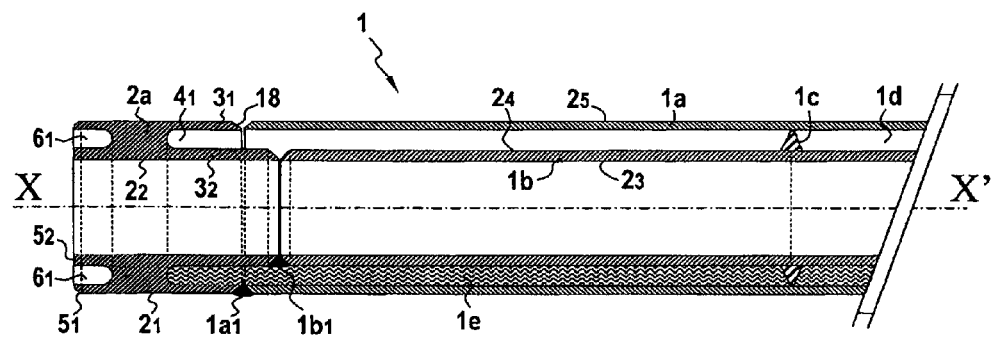
FIGS. 1A and 1B are side views in longitudinal section of a PiP type string filled with an insulating material under low gas pressure and fitted at its ends, respectively its left end (FIG. 1A) and its right end (FIG. 1B), with prior art junction forgings.
Figure 1B:
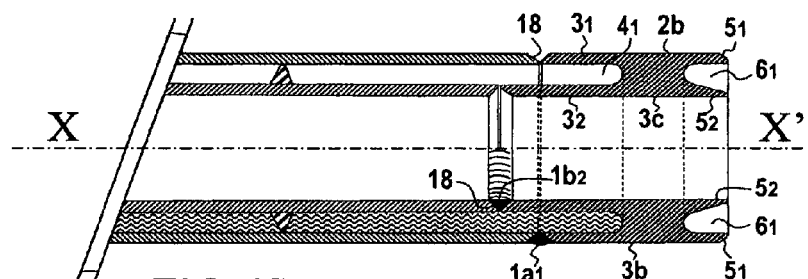

In FIGS. 1 to 5, there can be seen a PiP type pipe 1 constituted by an outer pipe 1a and an inner pipe 1b that are secured by welding to a first junction forging 2a situated on the left of FIG. 1A and to a second junction forging 2b situated to the right of FIG. 1B, the annular space 1d between said inner and outer pipes being filled with an insulating material 1e. Centralizer elements 1c are distributed, preferably at regular spacing, around the circumference and along the length of the inner pipe. These centralizers maintain the radial distance between the inner and outer pipes and thus maintain the thickness of said annular space at a value that is substantially constant.

Said junction forgings 2a, 2b are defined as follows:
in a radial direction relative to a longitudinal axis XX' about which said forging constitutes a body of revolution, the forging is defined by a cylindrical inner wall $2_2$ of substantially the same diameter as the main portion of said inner pipe 1b, and by an outer wall $2_1$ that is cylindrical and of diameter substantially equal to the outer diameter of the main portion of said outer pipe 1a; and in the direction of the longitudinal axis XX':
at the end of said junction forging that is to be welded to the ends of said outer and inner pipes of a said coaxial pipe element, said outer and inner walls $2_1$ and $2_2$ of said junction forging form, in longitudinal section, respective outer and inner first branches $3_1$ and $3_2$ that are of substantially the same thickness as said outer and inner pipes 1a and 1b to which they are to be assembled, said outer and inner first branches $3_1$ and $3_2$ defining a first annular cavity $4_1$; and at the opposite end of said junction forging that is to be assembled to another said junction forging, itself assembled by welding to the end of another element constituted by a set of two coaxial pipes, said outer and inner walls $2_1$ and $2_2$ form, in longitudinal section, respective outer and inner second branches $5_1$ and $5_2$ defining a second annular cavity $6_1$;

the ends of said first and second cavities $4_1$ and $6_1$ being spaced apart in said longitudinal direction XX' so as to define a solid zone of said junction forging in which said outer and inner walls $3_1$ and $3_2$ form the outer and inner faces of a common cylindrical wall.

The first annular cavity $4_1$ is open to the annular space 1d and can receive the insulating material 1e so as to continue insulation of the pipe as far as possible.

After two unit lengths of PiP fitted with junction forgings have been assembled and connected together, the second annular cavity $6_1$ of a first junction forging 2a at the downstream end of a first length 1 of PiP is open to a second annular cavity of a second junction forging 2a at the upstream end of a second length of PiP, thus forming a chamber made by welding together the ends of the outer second branches $5_1$. However this chamber is not sealed, since the ends of the inner second branches $5_1$ of the two junction forgings are not welded together, the faces of said branches merely coming into contact with each other.

More particularly, in the junction forgings:
the free end of said outer second branch $5_1$ presents a shape, preferably a chamfer 18, enabling it to be welded from outside the pipe to the free end of another said outer second branch of another junction forging with which it is to be assembled, said other junction forging itself being assembled to the end of a second said element comprising an assembly of two coaxial pipes; and the free end of said inner second branch $5_2$ presents a shape for making abutting contact with the free end of another said inner second branch of another said junction forging assembled to the end of a said second element constituting an assembly of two coaxial pipes, but without being welded thereto; and the free ends of said outer and inner second branches $5_1$ and $5_2$ of any one junction forging are at substantially the same level in said longitudinal direction XX'; and said two outer second branches of said two junction forgings for being assembled together by welding have the same thickness that is greater than the thickness of said outer pipe, and preferably greater than the thickness of said inner second branch of said junction forging.

The free ends of said outer and inner first branches $3_1$ and $3_2$ present a chamfer shape 18 that makes it possible in conventional manner to perform a so-called "first penetration" first welding pass followed by complete filling of the chamfer. In FIG. 1A, the chamfers 18 face outwards and are therefore suitable for being welded from the outside of said outer and inner pipes $3_1$ and $3_2$. In FIG. 1B, the chamfers 18 face outwards at the end of said outer first branch and inwards at the end of said inner first branch, thus making them suitable for being welded respectively from the outside of said assembly for said outer first branches, and from the inside of said inner pipe for said inner first branches.

The formation of said first and second annular cavities serves firstly to establish continuity in terms of the inside diameter of the inner pipe, and secondly to provide relative continuity and unchanging second moment of area for the cross-section going from the main portion of the PiP and through the connection zone, the thickness of the outer branch of the junction forging being substantially equal to or slightly greater than the thickness of the main portion of the outer pipe.

The spacing of the ends of said outer and inner first branches relative to the end of the first cavity, and the spacing of the end of said outer second branch relative to the end of said second cavity, make it possible to perform welding under good conditions, since the mass of steel on either side of the welding zone is substantially equal, so the melted zone is not disturbed by a "radiator effect" caused by the massive solid zone situated between the ends of said first and second cavities, said disturbance consisting in unbalanced cooling between left and right in said welding zone.

Finally, the continuity of the diameter of the outer wall at said junction forging relative to the diameter of the main portions of the outer pipes makes it possible to create a large increase in the second moment of area of the cross-section in the connection zone between two adjacent junction forgings, and thus to reinforce the connection, specifically where stresses are at a maximum. The second moment of area of the cross-section of a pipe about its center varies with the fourth power of its radius. Consequently, if the cross-section under consideration corresponds to that of the outer pipe of the PiP, the required thickness is greatly reduced, and even halved under certain circumstances, thereby considerably simplifying the assembly operations performed by welding on board installation vessels under conditions that are difficult.

Furthermore, the fact that two adjacent junction forgings are welded together solely via the ends of said outer second branches makes it possible for all of the phenomena associated with load transfer and stresses to be localized on the outside and to avoid involving said inner walls, thereby enabling any risk of cracking or fatigue phenomena to be monitored better and avoiding a total collapse of the device via its inner wall.

Furthermore, the fact that the two ends of said inner second branches of two adjacent junction forgings are not welded together allows said facing inner walls to perform small movements due to possible bending or pressure or temperature variations, and allows said inner walls to deform plastically, it being possible for said inner second branches to be battered without running the risk of transferring contact compression loads, thus making it possible to avoid disturbing the distribution of stresses in the assembly zone, with the main portion of the stresses being taken up via the outer walls of said forgings.

The shape of said cylindrical inner wall that ensures almost complete continuity with the inner pipe makes it possible to avoid vortex type turbulence phenomena occurring in the flow of fluid inside the device after it has been assembled, at the connection of two of said junction forgings belonging to two adjacent lengths of PiP.

It should be observed that after the two junction forgings have been connected together, said second cavity should not be sealed from the inside of said inner wall and from said inner pipe, since when starting to cause a fluid to flow along the inside, it is necessary for the fluid to migrate into said second cavity, with sealing being provided by the outer weld at the ends of said outer second branches, and with fluid being trapped in said second cavity throughout the lifetime of the installation.

All of these characteristics contribute to greatly improving the bending behavior and also the fatigue behavior of a device that involves two coaxial assembly elements fitted with said junction forgings connected to each other on board installation vessels, and for use as bottom-to-surface connections throughout a lifetime that may exceed 30 years.

Furthermore, said junction forgings can be fabricated and assembled in relatively easy and reliable manner both concerning connecting together two adjacent junction forgings and connecting a junction forging to the end of an assembly of at least two coaxial pipes.

In FIGS. 1A and 1B, there can be seen in side view and in longitudinal section a string 1 of the PiP type that is filled with an insulating material 1e under low gas pressure, and that is fitted at its left and right ends respectively with a first junction forging 2a and a second junction forging 2b, which forgings are assembled thereto in accordance with the prior art. Assembly is performed by welding using the following sequence. The inner pipe 1b is welded first to the inner branch 3$_1$ of the first junction end forging using a weld bead 1b$_1$ that is made from the outside of the inner pipe, as shown in FIG. 1A. thereafter, the outer pipe 1a is put into place around the inner pipe 1b and is held concentrically thereabout by centralizers 1c that are distributed along the string in optionally regular manner. The said outer pipe is then welded via a welding bead 1a$_1$ that is made from the outside of said outer pipe to the outer branch 3$_1$ of said first junction forging 2a. Both of these welds are made from the outside in known manner.

To clarify the figures, the welding beads are generally shown in the bottom portions only of the figures, with the elements to be welded together being shown facing each other in the top portions, ready for welding.

The other end requires welding to be performed in a special manner since the two pipes are in their final coaxial position with the end of the outer pipe covering the corresponding end of the inner pipe by a length $L_3$. When said second forging 2b is put into place, it is therefore necessary to perform the welding of said second forging 2b to the inner pipe 1b by means of a weld 1b$_2$ that is made from the inside of said inner pipe, which is very difficult and which requires complicated monitoring means, since the welders cannot see the weld bath directly because of the confinement inside the pipe. Welding the second forging 2b to the outer pipe 1a is then performed in conventional manner at 1a$_1$ from the outside.

Figure 1C:
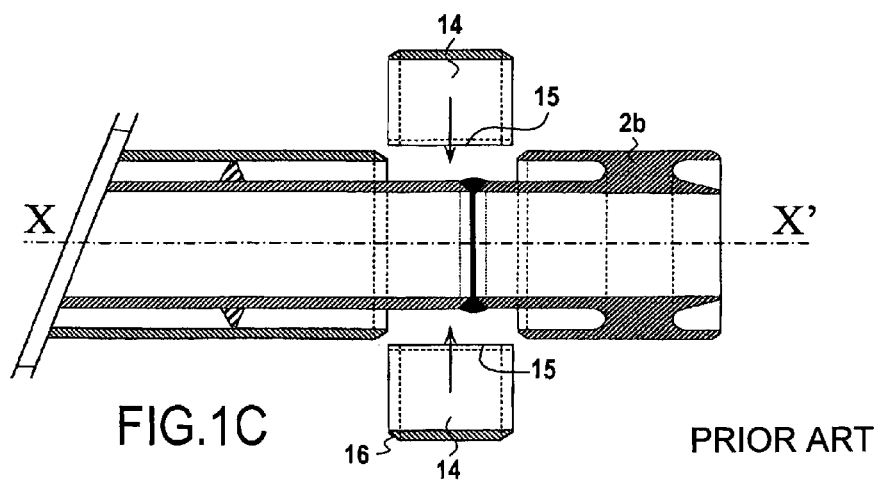
FIG. 1C shows a variant embodiment in which tubular half-sleeves are interposed between the ends of the outer branches of the forging and the end of the outer pipe.

FIG. 1C shows a variant embodiment of the prior art that enables all of the welds between the junction forgings 2a, 2b and the inner and outer pipes to be made from the outside of said pipes. To do this, in order to put the second forging 2b into place, the end of the inner pipe is caused to project beyond the end of the outer pipe, thereby enabling the inner pipe to be welded to said junction forging from the outside of the inner pipe. Thereafter, two half-shells 14, each in the form of a tubular half-sleeve, are interposed between the end of the outer branch 3$_1$ of the junction forging and the corresponding end of the outer pipe. However that embodiment is not satisfactory because it affects the mechanical reliability of the junction between the second junction forging 2b and the coaxial pipe elements, in particular because of the need to perform longitudinal welding at the longitudinal junctions 15 between the two half-shells, and because of the cross-welding between the circular welding in the chamfers 16 and the longitudinal welding along the longitudinal edges 15, at the ends of said longitudinal welding.

FIGS. 2A and 2B are side views in longitudinal section showing the second end of a PiP type string 1 being welded to a second junction forging 2b that is welded in accordance with the invention from the outside and in application of the following sequence. In a first step, the inner pipe and the outer pipe are welded to the first forging, as explained above with reference to FIG. 1A. The second end of the inner pipe 1b, which is initially set back by a length $L_3$ relative to the corresponding second end of the outer pipe, is then moved longitudinally along the axis XX' over a length $L_3+L_2$, by expanding the pipe in reversible manner as explained in greater detail below, so that said second end of said inner pipe projects beyond the end of the outer pipe by a length $L_2$, such that the distance between said end of the outer pipe 1a and the corresponding end of the outer branch of the second junction forging 2b, at the periphery thereof, reaches a value $L=L_2+L_1$ that is sufficient to provide access to the welding torch 9 and to conventional welding equipment for making the weld $1b_1$ from the outside, between the end of the inner pipe and the end of the inner branch $3_2$ of the forging 2b when said ends are placed end to end. After the welding and inspection operations, the expansion of the inner pipe is then resorbed and the second forging comes back into contact with the outer pipe in order to be welded thereto in known manner from the outside at $1a_1$.

FIG. 3A shows a first way of expanding the inner pipe, by using a system for heating said inner pipe. For this purpose, one or more heater cartridges 3, each constituted by a metal cylinder (or a plurality of spaced-apart metal cylinders) having surface electrical resistance elements, is/are inserted into the inside of said inner pipe and distributed in optionally uniform manner along said inner pipe. These cartridges 3 are powered by a cable 3a. The heating causes the pipe that is raised in temperature to expand by an amount that is proportional to its length and to the change of temperature in the zone under consideration. Expanding the inner pipe 1b serves to free an empty space $L=L_0=L_2+L_1$ between the ends of the outer branch $3_1$ and the outer pipe 1a, thereby giving access to the welding zone in order to assemble together the second forging and the end of said inner pipe, said welding $1a_1$ being performed in known manner from the outside. After welding and inspection operations, the heating is removed, and then on cooling the inner pipe retracts and the space of length L tends to a length of zero. The second forging 2b then comes into contact with the outer pipe 1a at its periphery and can then be welded in known manner from the outside at $1a_1$.

For clarity of the drawings, there is shown a sleeve acting as a template 5 for positioning the second forging 2b relative to the inner pipe 1a (visible in FIGS. 3A, 4A, and 4C, only) however that device which is known to the person skilled in the art is necessary under all circumstances for keeping said second forging in place throughout the duration of the welding process.

FIG. 3B shows an alternative thermal expansion of the inner pipe that is based on using a hot air generator 4, or possibly a simple gas or oil burner, that is fed from one of the ends of the PiP, e.g. from its second end, via a hose 4a.

FIG. 3C shows expansion based on applying mechanical traction to the inner pipe by using a winch 8 outside the pipe that is connected via a cable 8a to a mandrel 6 having self-locking wedges 6a and that is situated inside the inner pipe, the mandrel jamming against the inside wall $2_3$ of said inner pipe in a zone that is close to the end of said inner pipe, e.g. at a distance of 1 m from said end. The outer pipe 1a of the PiP is held securely by a blocking device 7 that is secured to the ground, applying radial compression to said outer pipe via the outside surface $2_5$ of its second end. The winch 8 is then put under tension and when the desired space $L=L_0$ is reached, said winch is blocked and the operation of welding the second forging 2b to the end of the inner pipe is performed from the outside in the above-described manner.

A similar traction device based on using hydraulic actuators 13 is described in greater detail below, in a preferred version of the invention.

In all of the above-described methods, conventional welding of the kind known to the person skilled in the art as "orbital welding" is performed using welding apparatus of the type having a guide collar installed on the pipe with a carriage traveling therealong that carries one or more welder heads, welding then being performed on a pipe that is stationary relative to ground, with said welder heads traveling around said pipe. When performing welding in this manner, maintaining a weld bath requires numerous parameters to be varied depending on the zone that is being welded. The top portion of the pipe is extremely simple to weld since the weld bath stays in place naturally, whereas underneath the weld bath tends to flow away and disappear, and the side and oblique portions present similar difficulties to varying extents. Thus, for this type of welding, the main welding parameters, namely current, voltage, frequency, linear travel speeds of the welder head and of the filler wire, etc. are varied in real time as a function of the position of said welder torch as it travels around the pipe.

FIGS. 4A to 4F show a preferred implementation of the invention in which the welder head 9 remains stationary relative to ground, preferably vertically above the pipe, with the entire length of the pipe being supported by rollers or turning gear 10 enabling the pipe to be set into rotation in controlled manner by means of motor-driven turning gear 10a so as to perform the welding operation under the best operating conditions for maintaining the weld bath.

FIG. 4A shows the second forging 2b to be welded to the inner pipe 1b, thermal expansion being provided by the heater cartridges 3 described above with reference to FIG. 3A.

In FIG. 4B, at the end of the welding the second forging to the inner pipe 1b, heating is stopped and the inner pipe retracts, thereby enabling the outer branch of the second forging 2b to be welded to the second end of the outer pipe using the same welder head 9, after it has been repositioned to register with the circular weld bead 1a, that is to be made.

FIG. 4C shows a detail of the device of the invention making use of a traction winch 8, as described above with reference to FIG. 3C. In order to allow the string to rotate freely, the device includes a first peripheral body 11 placed over the outside surface $2_5$ of the outer pipe and held stationary relative to ground, the body 11 co-operating via a first bearing 11a with a collar having blocking wedges 11b that compresses the outside surface of the outer pipe so as to prevent any movement in translation of the string 1 to the left along the axis XX', while allowing it to rotate about said axis XX'. By way of example, said first bearing 11a is constituted by a crossed roller bearing inside an outer first cage $11a_1$ that is secured to said peripheral body 11 and an inner cage $11a_2$ that is secured to said wedge collar 11b. The traction cable 11a is connected to the self-locking mandrel 6 via a swivel type device 6b that allows the mandrel 6 to turn about the longitudinal axis XX'. The process of expanding the inner pipe 1b remains similar to the process described above with reference to FIG. 3C, and the welding process then remains identical to that described with reference to FIGS. 4A and 4B, the string being rotated by motor drive (not shown) incorporated in the first peripheral body 11 or by motor drive 10a incorporated in the turning gear 10.

FIG. 4D shows a detail of a device using hydraulic actuators 13 for expanding the inner pipe 1b, while also allowing the string to turn, and thus making it possible to use a welder head 9 in a stationary position vertically above the pipe that is to be welded.

The first peripheral body 11, the first bearing 11a and the self-locking wedge collar 11b secured to the string, and also the motor drive 11a for controlling rotation of the string, are identical to those described with reference to FIG. 4C. A tie member 12c constituted by a rigid bar or by a cable, or even by an actuator, connects the self-locking mandrel 6 to a second bearing 12a, e.g. constituted by a crossed roller bearing, via a support 12b that is secured to the tie member 12c. The second bearing 12a is constituted by a drop-roller bearing incorporated in and between an inner cage $12a_2$ secured to said support 12b and an outer cage $12a_1$ secured to a second peripheral body 12 located over the outer surface of the inner pipe and supporting at least two hydraulic actuators 13 disposed diametrically opposite each other about the axis XX', specifically six hydraulic actuators that are regularly distributed circularly as shown in FIG. 4F. The pistons 13a of said actuators 13 are secured to piston rods 13b that come into abutment at 13c with the first peripheral body 11. Thus, by applying pressure P to the actuators 13, the second peripheral body 12 is moved away from the first peripheral body 11 along the direction XX', the tie member 12c then exerting traction on the inner pipe via the self-locking mandrel 6. By progressively increasing the pressure P, the inner pipe 1b is expanded until the space between the ends of the outer pipe 1a and of the outer branch $3_1$ of the forging reaches the value $L=L_0$ needed for welding the forging 2b to the inner pipe 1b, as explained above. Said first and second bearings 11a-12a allow the entire string to rotate while said first and second peripheral bodies 11, 12 and the rods 13b of the actuators 13 remain stationary relative to the ground, thus making it possible to use a stationary welder head 9 that is advantageously situated vertically above the pipe that is to be welded. Once the weld 1b, between the inner pipe 1b and the forging 2b have been completed, the pressure in the actuators is released, the inner pipe then retracts, and the forging comes into contact with the outer pipe via its periphery, and it can then be welded thereto in the same manner.

The use of a tensioning winch 8 is described with reference to FIGS. 3C and 4C, however it remains within the spirit of the invention to use an actuator that is secured to the ground and that is situated on the axis XX' of the string and that is connected to the self-locking mandrel 6 via a metal cable or bar identical to the tie member 12c in FIG. 4D.

For a PiP that is to convey fluids at very high temperature, the outer pipe is generally at the same temperature as the bottom of the sea, i.e. 3° C. to 5° C., whereas the inner pipe is at the temperature of the fluid which may be as much as 120° C. to 150° C., or even more. Thus, during fabrication of the PiP string, the two pipes at rest are at substantially identical temperature (e.g. 20° C. to 30° C.). Similarly, once placed on the sea bed they are again both at the temperature of the bottom of the sea (3° C. to 5° C.), but as soon as the fluid begins to flow, the temperature of said fluid leads to compression stress being generated in said inner pipe 1b, since the ends of the inner pipe are blocked against the forgings. This compression along the axis XX' runs the risk of creating instabilities of the lateral buckling type in a plane perpendicular to XX', and this risk is eliminated by installing centralizers 1c at optionally regular intervals in order to prevent such phenomena appearing. However, centralizers are expensive and difficult to install, and in addition they give rise to thermal bridges that correspondingly reduce the effectiveness of the insulation system, so it is advantageous to reduce the number of centralizers. For this purpose, while the inner pipe 1b and the outer pipe 1a are at rest and at the same temperature, the length of the inner pipe is adjusted so that it is shorter than the outer pipe by a value $L_1+e$, as shown in FIG. 5A. The inner pipe is then expanded using one of the methods described above, with the same thermal parameters or force parameters then giving an expansion that produces a space $L=L_0-e$ between the end of the outer branch $3_2$ of the forging and the end of the outer pipe. The forging 2b is then welded to the inner pipe 1b in the manner described above and the inner pipe is retracted. When the forging comes into contact with the outer pipe 1a, the inner pipe then presents residual traction that is proportional to the value of e. In practice, for a string having a length of 50 m, $L_1$ represents 10 mm to 100 mm, and the value of e depends on the temperature operating point of the pipe. For example, if the pipe is to be raised to a temperature difference relative to sea water δT=120° C. when in use, then provision can be made conventionally for the value of e to lie in the range 35 mm to 45 mm, corresponding to stress, when due to temperature alone, that is zero for a temperature difference δT=60° C., and thus to the compression stress level in the inner pipe being offset downwards by about 50%. In the same manner, for δT=180° C., e=55 mm to 60 mm so as to obtain the same 50% downward offset of the compression stress in the inner pipe.

Thus, during use at high temperature, the compression stress in the inner pipe is correspondingly reduced, thereby enabling the spacing of the centralizers to be increased, and thus enabling the number of centralizers to be reduced.

In order to perform the final welding of the second forging 2b to the outer pipe, care should be taken to keep the inner pipe at a level of expansion (using temperature or tension) that is sufficient to ensure that the faces of the two parts for welding together do not press against each other significantly, so as to ensure that welding can be performed without compression stresses in the welding zone. At the end of the welding process, the expansion (by temperature or tension) can then be completely relaxed with the inner pipe then reaching the desired pretension level.

In order to perform the operations of welding the second forging to the inner pipe, while leaving the string stationary, as described with reference to FIGS. 3A, 3B, 3C, the distance L must be about 10 cm so as to allow the welder heads and the circular guide carriages to pass, and so as to give good visibility for monitoring the process. This expansion value can be obtained only with strings of sufficient length, e.g. 24 m, 36 m, 48 m, or even more, and cannot realistically be envisaged with shorter lengths since the temperature difference or the traction stress required would then be incompatible with the steels used.

By way of example, a PiP string having a length of 50 m and constituted by an inner pipe having a diameter of 273.1 mm and a thickness of 15.88 mm, and an outer pipe having a diameter of 355.6 mm and a thickness of 19.1 mm would require a traction force of 329.5 (metric) tonnes (t) in order to obtain a shift of the end of the inner pipe such that L=100 mm, with 61.1% of the shift being obtained by lengthening of the inner pipe (in traction), and 38.9% being obtained by contraction of the outer pipe (in longitudinal compression).

A limit is imposed by the fact that the elastic limit of steel must not be exceeded, and for steel of the X60 grade in compliance with American standard API-5L, the elastic limit is 413 MPa, so the traction stress in the inner pipe and the compression stress in the outer pipe are respectively 257 MPa and 163 MPa, i.e. respectively 62% to 40% of their elastic limits. These values show that if the length of the string is halved (string of length 25 m), then these values need to double to obtain the desired elongation (L=100 mm), and the stress in the inner pipe then becomes unacceptable, even though it remains acceptable in the outer pipe.

By using thermal expansion of the inner pipe, or which comes to the same but which is much more complicated to perform, by cryogenic cooling of the outer pipe, expansion is obtained at relatively low temperature.

By way of example, the same inner pipe having a diameter of 273.1 mm and a thickness of 15.88 mm when subjected to a temperature difference of 192.3° C. over a length of 40 m presents thermal expansion L of 100 mm.

For operation of the inner pipe with a temperature difference δT+120° C. relative to sea water, the PiP is advantageously made with a value e=39 mm, corresponding to traction prestress of 100.15 MPa in the inner pipe when the PiP is not in service, which represents 24.3% of its elastic limit, with stress being zero when the temperature difference is δT+60° C., and with a compression stress of 100.15 MPa when the temperature difference is at its maximum δT+120° C. Said initial traction stress at rest then corresponds to a pretension of 128.5 t. By increasing the value of e, the level of maximum compression stress in the inner pipe at the maximum operating temperature is decreased. These values are given purely by way of illustration to show the advantage of the invention, and they are merely approximate since exact calculation of the stresses within the PiP in operation must also take account of the effect due to the internal pressure of the flowing fluid, and also of the effects of the pressure at the sea bottom which is approximately 10 MPa, i.e. about 100 bar per 1000 m of depth. Thus, as a function of the various operating parameters of the PiP (operating pressure, temperature, depth of water, . . . ), it is necessary to take into consideration values for e that are adapted to operating conditions, and thus to offset the maximum compression stress in the inner pipe downwards by a percentage that is adapted to meet each of the circumstances encountered.

When the preinstalled insulation system between the two pipes presents an upper limit that is not to be exceeded, e.g. 120° C., it is advantageous to perform combined expansion in which a fraction of the expansion is produced thermally while the remainder is produced with the help of one of the above-described traction means. Such combined expansion is also advantageous on safety grounds since it makes it possible to ensure that operators are not working close to mechanical items that are under high levels of tension, where said tensions may be of the order of 300 t to 500 t and may even be as much as 1000 t or more when working on very large PiP type pipes.

When a stationary welder head is used and the string is caused to rotate, as described with reference to FIGS. 4A, 4B, 4C, and 4D, the space needed for passing the head alone is much smaller, and can under certain circumstances then be limited to 5 cm to 6 cm, thereby reducing the forces required correspondingly, or reducing the amplitude of the thermal effects needed to achieve this result.

Thermal expansion also presents a safety advantage since it avoids the need to work close to elements that are under high levels of mechanical stress. However raising the temperature and cooling the inner pipe require a certain length of time, thereby correspondingly reducing production rates.

Mechanical expansion requires considerable forces that can be as great as several hundreds of tonnes, and that involve appropriate safety means. However applying tension and relaxing said tension can be performed in very short lengths of time, of the order of a few minutes.

In another variant of the invention, closure plugs, commonly known as "packers", are installed at a few meters from the ends of the inner pipe, thus enabling said inner pipe to be completely filled with water, which can then be put under pressure in order to lengthen said inner pipe. By way of example, for the PiP described in detail above, expansion solely under the end effect for the inner pipe under a pressure of 300 bar is about 32.6 mm for a said string presenting a length of 50 m. Nevertheless, this expansion technique is of interest only for strings of very great length (75 m to 100 m) since the value of L remains small for strings of length 50 m.

In a variant of the invention, said packers are used for forming a leaktight volume inside the inner pipe through which hot water is caused to flow, with the hot water coming for example from a tank that is lagged and maintained at a desired temperature. Thus, at the beginning of the cycle, after the packers have been installed, said volume is filled with water that is already hot and that is maintained at the desired temperature merely by circulating, with the required heat preferably being delivered within the lagged tank. At the end of the cycle, the hot water is recovered and returned to said lagged tank, ready for the next cycle. This heating technique is advantageously associated with means for applying mechanical traction in order to obtain a greater level of expansion.

The invention claimed is:

1. A coaxial pipe element comprising:
    an inner pipe;
    an outer pipe spaced from said inner pipe, thereby forming an annular space therebetween; and
    a sealed closure positioned at each end of said inner and outer pipes and annular space, each said sealed closure being constituted by a junction forging in the form of a body of revolution,
        each of said junction forgings being constituted as a single integral block for joining with another coaxial pipe element,
        each of said junction forgings comprising at least two first branches of revolution, in which an inner first branch of revolution is welded directly to one end of said inner pipe with a circular weld bead and an outer first branch is welded directly to the end of said outer pipe with a circular weld bead,
        said inner first branches of revolution being longer than said outer first branches by a length L, in the axial longitudinal direction of said coaxial pipe element,
        each of said junction forgings at each end of said pipe element being designed to be assembled at one end to the ends of said outer and inner pipes of said coaxial pipe element, and at an opposite end directly to another said junction forging, itself assembled by welding to the end of another or second unit comprising two coaxial pipes,
        wherein, all of said circular weld beads are located on the outside of the inner and outer pipes, and
    wherein each respective end of the outer pipe is connected to the respective sealed closure by a single weld and there are no intervening welds on the outer pipe.

2. The coaxial pipe element according to claim 1, wherein said inner pipe is subjected to traction stress exerted by each of said junction forging at each end when said coaxial pipe element is not in service.

3. The coaxial pipe element according to claim 2, wherein when said coaxial pipe element is not in service, said inner pipe is subjected to traction stress that is less than about 90% of the elastic limit of the steel constituting said inner pipe.

4. The coaxial pipe element of claim 3, wherein said inner pipe is subjected to traction stress that is in the range of from about 5% to about 75% of the elastic limit of the steel constituting said inner pipe.

5. The coaxial pipe element according to claim 1, wherein said pipe element is designed for use in assembling steel undersea pipes, and presents a length lying in the range of from about 10 m to about 100 m.

6. The coaxial pipe element according to claim 1, wherein, at their one ends, said inner and outer first branches of said junction forgings are respectively of substantially the same thicknesses as said inner and outer pipes.

7. The coaxial pipe element according to claim 1, wherein said pipe element includes at each end a said forging defined as follows:
   in a radial direction relative to a longitudinal axis XX' of revolution of said forging, it is defined by a cylindrical inner wall having substantially the same diameter as the main portion of said inner pipe, and by a cylindrical outer wall of diameter substantially equal to the outer diameter of the main portion of said outer pipe; and
   in the longitudinal axial direction XX',
   at the end of said junction forging that is assembled by welding to the ends of said outer and inner pipes, said outer and inner walls of said junction forging form, in longitudinal section, respective outer and inner first branches that are substantially of the same thicknesses as said outer and inner pipes to which they are assembled, said outer and inner first branches defining a first annular cavity; and
   the opposite end of said junction forging that is to be assembled to another said junction forging said outer and inner walls forming, in longitudinal section, respective outer and inner second branches defining a second annular cavity;
   the ends of said first and second cavities being spaced apart in said longitudinal direction XX' so as to define a solid zone of said junction forging in which said outer and inner walls form the outer and inner faces of a single cylindrical wall.

8. The coaxial pipe element according to claim 1, wherein said pipe element includes at each end a said forging defined as follows:
   in a radial direction relative to a longitudinal axis XX' of revolution of said forging, it is defined by a cylindrical inner wall having substantially the same diameter as the main portion of said inner pipe, and by a cylindrical outer wall of diameter substantially equal to the outer diameter of the main portion of said outer pipe; and
   in the longitudinal axial direction XX',
   at the end of said junction forging that is assembled by welding to the ends of said outer and inner pipes, said outer and inner walls of said junction forging form, in longitudinal section, respective outer and inner first branches that are substantially of the same thicknesses as said outer and inner pipes to which they are assembled, said outer and inner first branches defining a first annular cavity; and
   the opposite end of said junction forging that is to be assembled to another said junction forging, said outer and inner walls forming, in longitudinal section, respective outer and inner second branches defining a second annular cavity;
   the ends of said first and second cavities being spaced apart in said longitudinal direction XX' so as to define a solid zone of said junction forging in which said outer and inner walls form the outer and inner faces of a single cylindrical wall;
   the free end of said outer second branch presents a shape, making it suitable for being welded from outside the pipe to the free end of another said outer second branch of another junction forging to which it is to be assembled, said other junction forging itself being assembled to the end of the second unit; and
   the free end of said inner second branch is of a shape enabling it to make contact in abutment against the free end of another said inner second branch of another said junction forging assembled to the end of a said second coaxial pipe assembly element, without being welded thereto; and
   the free ends of said outer and inner second branches of a single junction forging coming to substantially the same level in said longitudinal direction; and
   said two outer second branches of said two junction forgings that are to be assembled together by welding having the same thickness.

9. The coaxial pipe element of claim 8, wherein each said shape is a chamfer.

10. The coaxial pipe element of claim 8, wherein the thickness of said welding is greater than the thickness of said inner second branch of said junction forging.

11. An assembly constituted by assembling together at least two coaxial pipe elements according to claim 8, a said junction forging assembled by welding to a junction forging of an other said coaxial pipe assembly element, each of said two junction forgings being welded to each other solely via the ends of outer second branches, the non-welded ends of two inner second branches coming into abutting contact against each other during assembly of said junction forgings, such that second inner cavities are not sealed from the inside of inner walls of the forgings and said inner pipes of the another said coaxial pipe element.

12. An assembly constituted by assembling together at least two coaxial pipe elements according to claim 1, a said junction forging of one coaxial pipe element assembled by welding to a junction forging of the other said coaxial pipe element.

13. The coaxial pipe element according to claim 1, wherein the length of the pipe element is in the range of from about 20 m to about 50 m.

14. The coaxial pipe element of claim 1, wherein said annular space is filled with an insulating material.

15. The coaxial pipe element according to claim 14, wherein the insulating material is one of a microporous or nanoporous material.

16. The coaxial pipe element according to claim 15, wherein the insulating material is an aerogel.

17. The coaxial pipe element according to claim 14, wherein the insulating material is in the form of grains having a diameter lying in the range of from about 0.5 mm to about 5 mm.

18. A method of fabricating the coaxial pipe element of claim 1, comprising the following successive steps:
   1) welding the cylindrical end of said inner first branch of a first junction forging to a first end of said inner pipe that is not covered by the outer pipe, said welding being performed from the outside of said inner pipe;
   2) moving said outer pipe coaxially around said inner pipe so that a first end of said outer pipe makes end-to-end contact with the corresponding end of the outer first branch of said first junction forging, the second end of said inner pipe being set back from the corresponding second end of said outer pipe by a length $L_3$ that is not less than $L_1$; and 3) welding the end of said outer first branch of said first junction forging to the end of said outer pipe, from the outside of said outer pipe;

4) reversibly expanding along the axial longitudinal direction said second end of said inner pipe so that it projects by a length $L_2$ from said corresponding second end of said outer pipe;

5) from the outside of said inner pipe, while said inner pipe is in the expanded position, welding said second end of said inner pipe to the end of the inner first branch of a second said forging;

6) resorbing at least part of the expansion of said inner pipe until said outer first branch of said second forging comes end-to-end with said second end of said outer pipe; and 7) from the outside of said outer pipe, welding the end of said outer first branch of said second forging to said second end of said outer pipe, wherein each respective end of the outer pipe is connected to the respective junction forging by a single weld and there are no intervening welds on the outer pipe.

19. The method according to claim 18, wherein:
in step 2), said second end of the outer pipe at its end for connection to said second forging is adjusted so as to project beyond said corresponding second end of the inner pipe by a length $L_3=L_1+e$; and
in step 4), said inner pipe is expanded by a length $L_2$ greater than or equal to $L_1+e$, such that in step 6), part of said expansion is resorbed, and at the end of the welding in step 7), said inner pipe is subjected to traction corresponding to residual elongation less than or equal to e.

20. The method according to claim 18, wherein, in step 4), said inner pipe is expanded by being heated.

21. The method according to claim 18, wherein in step 4), said expansion is performed by applying mechanical traction to said inner pipe with the help of a traction device comprising a winch or an actuator placed outside said inner pipe.

22. The method according to claim 21, wherein, in step 4), said expansion is performed by applying longitudinal traction to said inner pipe and simultaneous longitudinal compression to said outer pipe via their said second ends.

23. The method according to claim 22, wherein said welding is performed with a device comprising a stationary welder head, and said pipe element is caused to rotate about the longitudinal axis of said pipe element.

24. The method according to claim 23, wherein said traction device comprises or co-operates with:
means for blocking said inner pipe, thus enabling said inner pipe to be caused to move in longitudinal translation in expansion when the traction device is actuated, while allowing said inner pipe to rotate about the longitudinal axis of the inner pipe; and
means for blocking said outer pipe, preventing any movement in longitudinal translation of said outer pipe, and allowing the outer pipe to rotate about the longitudinal axis of the outer pipe.

25. The method according to claim 24, wherein said traction device comprises or co-operates with at least one tie member constituted by a rigid rod or a cable, suitable for being moved in longitudinal translation by a winch or an actuator connected to a second blocking device for blocking said inner pipe by applying radial compression to the inner wall of said inner pipe.

26. The method according to claim 25, wherein said traction device comprises at least two actuators disposed substantially evenly about said stationary first peripheral body having pistons secured to rods that come into abutment against said stationary first peripheral body supporting said first bearing, said actuators being connected to said tie member via a second bearing, said second bearing being suitable for co-operating with a support secured to said tie member, such that by applying pressure to said actuators, the tie member exerts traction on the inner pipe while allowing said pipe element to rotate about the longitudinal axis of the pipe element, said first peripheral body and a second peripheral body and the rods of the actuators remaining stationary relative to the ground, thereby enabling the use of a stationary welder head.

27. The method according to claim 26, wherein said second bearing comprises a crossed roller bearing and the second peripheral body is stationary relative to the ground supporting said actuators.

28. The method according to claim 23, wherein said means for blocking the outer pipe comprise:
a first device for blocking by radial compression that is disposed in stationary manner around said outer pipe; and
a first peripheral body that is stationary relative to the ground, co-operating with said first blocking device via a first bearing allowing said outer pipe to rotate about the longitudinal axis of the outer pipe.

29. The method according to claim 28, wherein said first bearing comprises crossed roller bearings in and between an inner cage secured to a collar and an outer cage secured to said stationary first peripheral body.

30. The coaxial pipe element according to claim 1, wherein said pipe element includes at each end a said forging defined as follows:
in a radial direction relative to a longitudinal axis XX' of revolution of said forging, it is defined by a cylindrical inner wall having substantially the same diameter as the main portion of said inner pipe, and by a cylindrical outer wall of diameter substantially equal to the outer diameter of the main portion of said outer pipe; and
in the longitudinal axial direction XX',
at the end of said junction forging that is assembled by welding to the ends of said outer and inner pipes, said outer and inner walls of said junction forging form, in longitudinal section, respective outer and inner first branches that are substantially of the same thicknesses as said outer and inner pipes to which they are assembled, said outer and inner first branches defining a first annular cavity;
the opposite end of said junction forging that is to be assembled to another said junction forging, said outer and inner walls forming, in longitudinal section, respective outer and inner second branches defining a second annular cavity;
the ends of said first and second cavities being spaced apart in said longitudinal direction XX' so as to define a solid zone of said junction forging in which said outer and inner walls form the outer and inner faces of a single cylindrical wall; and
the free end of said outer second branch presents a chamfer shape making the free end suitable for being welded from outside the pipe to the free end of another said outer second branch of another junction forging to which it is to be assembled, said other junction forging itself being assembled to the end of the second unit.

31. An assembly constituted by assembling together at least two coaxial pipe elements according to claim 1, each junction forging assembled by welding to a junction forging of an other said coaxial pipe assembly element, each of said two junction forgings being welded to each other solely via the ends of outer second branches, the non-welded ends of two inner second branches coming into abutting contact against each other during assembly of said junction forgings, such that second inner cavities are not sealed from the inside of inner walls of the forgings and said inner pipes of the another said coaxial pipe elements.

\* \* \* \* \*